United States Patent
Kim et al.

(10) Patent No.: US 11,761,411 B2
(45) Date of Patent: Sep. 19, 2023

(54) APPARATUS FOR REDUCING FLOW NOISE OF AIR INTAKE SYSTEM OF VEHICLE

(71) Applicants: Hyundai Motor Company, Seoul (KR); Kia Corporation, Seoul (KR)

(72) Inventors: Je Yeon Kim, Yangsan-si (KR); Hae Jun Jeong, Siheung-si (KR); Yoon Geun Cho, Daegu (KR); Seung Hyun Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 140 days.

(21) Appl. No.: 17/462,701

(22) Filed: Aug. 31, 2021

(65) Prior Publication Data
US 2022/0381209 A1 Dec. 1, 2022

(30) Foreign Application Priority Data
May 25, 2021 (KR) .................. 10-2021-0067161

(51) Int. Cl.
*F02M 35/12* (2006.01)
*F02M 35/10* (2006.01)

(52) U.S. Cl.
CPC .... *F02M 35/1266* (2013.01); *F02M 35/1272* (2013.01)

(58) Field of Classification Search
CPC . F02M 35/1266; F02M 35/1272; F16L 17/06; F16L 55/033
See application file for complete search history.

(56) References Cited

U.S. PATENT DOCUMENTS

| | | | | |
|---|---|---|---|---|
| 2003/0085071 | A1* | 5/2003 | Boast | F01N 13/18 181/255 |
| 2007/0107982 | A1* | 5/2007 | Sullivan | F01N 1/06 181/251 |
| 2008/0185217 | A1* | 8/2008 | Baude | F04D 29/665 181/229 |
| 2011/0074067 | A1* | 3/2011 | Khami | F02M 35/10104 264/513 |
| 2016/0040635 | A1* | 2/2016 | Satarino | F16L 21/007 285/399 |
| 2018/0029425 | A1* | 2/2018 | Nourzad | B60C 19/002 |
| 2018/0058397 | A1* | 3/2018 | Kimura | E04B 1/84 |
| 2018/0363602 | A1* | 12/2018 | Itagaki | H01L 23/467 |
| 2019/0150548 | A1* | 5/2019 | Albani | B01D 53/0415 |

FOREIGN PATENT DOCUMENTS

KR 10-2007-0080702 A 8/2007

* cited by examiner

*Primary Examiner* — Long T Tran
(74) *Attorney, Agent, or Firm* — Morgan, Lewis & Bockius LLP

(57) ABSTRACT

An apparatus for reducing flow noise of an air intake system of a vehicle is provided as an assembly of a body member and a cover member. An acoustic metamaterial unit includes a chamber having a predetermined size, an inlet flow path, and an outlet flow path provided therein and is connected to a pipe of an air intake system. The apparatus advantageously reduces or removes high-frequency flow noise occurring in a turbocharger by using the acoustic metamaterial unit. The size and shape of the acoustic metamaterial unit is standardized such that the acoustic metamaterial unit is used compatibly regardless of the type of vehicles, which can make it possible to advantageously reduce costs and improve salability.

11 Claims, 5 Drawing Sheets

APPARATUS FOR REDUCING FLOW NOISE OF AIR INTAKE SYSTEM OF VEHICLE

CROSS REFERENCE TO RELATED APPLICATION

The present application claims the benefit of priority of Korean Patent Application No. 10-2021-0067161 filed on May 25, 2021 in the Korean Intellectual Property Office, the entire contents of which is incorporated herein for all purposes by this reference.

TECHNICAL FIELD

The present disclosure relates to an apparatus for reducing flow noise of an air intake system of a vehicle, and more particularly, to an apparatus for reducing flow noise of an air intake system of a vehicle, the apparatus being configured to reduce high-frequency flow noise occurring in a turbocharger by using an acoustic metamaterial.

BACKGROUND

Recently, the application of engine downsizing technology to internal combustion engine (ICE) vehicles is gradually increasing.

The engine downsizing technology is a technology enabling an engine to accomplish higher-level performance. The engine downsizing technology improves fuel efficiency by reducing the displacement or the number of cylinders of the engine and enables a smaller-displacement engine to accomplish higher-level performance by combining turbocharger technology, fuel direct injection technology, and the like.

As the application of turbochargers to the ICE vehicles increases due to the engine downsizing, high-frequency flow noise may occur in the turbochargers, and a high-frequency resonator is applied to an air intake system of a vehicle in order to reduce the high-frequency flow noise. However, since the resonator has a relatively-large size, it is extremely difficult to effectively dispose the relatively-large resonator in the engine room having a limited space.

In addition, since resonators have different shapes depending on the vehicle type, there is a problem in that resonators are incompatible.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems mentioned in the background section, and the present disclosure is intended to propose an apparatus for reducing flow noise of an air intake system of a vehicle, the apparatus being configured to reduce high-frequency flow noise occurring in a turbocharger by using an acoustic metamaterial disposed in a pipe of an air intake system of a vehicle in which air flows. The acoustic metamaterial may be used in place of a resonator to reduce high-frequency flow noise, thereby enabling the limited space of the engine room to be used more efficiently. In particular, the acoustic metamaterial may be compatibly used regardless of the type of vehicles, thereby reducing costs and improving salability.

In order to realize at least one of the above-described objectives, according to an exemplary embodiment of the present disclosure, an apparatus for reducing flow noise of an air intake system of a vehicle may include: a pipe-shaped body member allowing air to flow therethrough; and a cover member coupled to the body member while covering an outer circumferential portion of the body member such that a chamber for reducing high-frequency flow noise is arranged between the cover member and the body member. The chamber may be connected to an inside of the body member through a flow path.

A counterpart component may be coupled to a first end of the body member. The apparatus may further include a first sealing member coupled to the first end of the body member and the counterpart component to maintain airtightness between one end of the body member and the counterpart component.

The apparatus may further include a second sealing member coupled to a second end of the body member and the cover member to maintain airtightness between the second end of the body member and the cover member.

Both ends of the body member may protrude toward one side and another side of the cover member. The body member may include threads on the both ends thereof, respectively, the threads being configured to be coupled with counterpart components.

The chamber may include an air gap having a predetermined size defined between the body member and the cover member. The flow path may include an inlet flow path extending through the body member to connect a first side of the chamber and the inside of the body member to each other and an outlet flow path extending through the body member to connect a second side of the chamber and the inside of the body member to each other.

The inlet flow path may form a path having a zigzag shape and connected to the inside of the body member and the first side of the chamber, by having a plurality of first body ribs and a plurality of first cover ribs disposed to be alternately inserted into each other, the plurality of first body ribs outwardly protruding from the body member and the plurality of first cover ribs inwardly protruding from the cover member.

The outlet flow path may form a path having a zigzag shape and connected to the inside of the body member and the second side of the chamber, by having a plurality of second body ribs and a plurality of second cover ribs disposed to be alternately inserted into each other, the plurality of second body ribs outwardly protruding from the body member and the plurality of second cover ribs inwardly protruding from the cover member.

The cover member may include a first cover member and a second cover member disposed symmetrically to each other. The first cover member and the second cover member may cover halves of outer circumferential portions of the body member, which are an outer circumferential portion on one side of the body member and the outer circumferential portion on another side of the body member, respectively, in which both ends of the first cover member and the second cover member in contact with each other are fused together.

An acoustic metamaterial unit may be provided as an assembly of a single member of the body member and a single member of the cover member. The acoustic metamaterial unit may be connected to a pipe of the air intake system to reduce high-frequency flow noise.

An acoustic metamaterial unit may be provided as an assembly of a single member of the body member and a single c member of the over member. A plurality of acoustic metamaterial units may be connected in series to form an acoustic metamaterial complex. The acoustic metamaterial complex may be connected to a pipe of the air intake system to reduce high-frequency flow noise.

An acoustic metamaterial unit may be provided as an assembly of a single member of the body member and a single member of the cover member. The counterpart component may be another acoustic metamaterial unit. The first sealing member may maintain airtightness between the coupled acoustic metamaterial units.

When high-frequency flow noise passing through the pipe of the air intake system is introduced into the chamber through the flow path of the acoustic metamaterial unit, resonance of a specific frequency wavelength may occur in the chamber, thereby reducing the high-frequency flow noise.

The apparatus for reducing flow noise of an air intake system of a vehicle according to the present disclosure is provided as an assembly of the body member and the cover member, i.e., a configuration in which the acoustic metamaterial unit with the chamber having a predetermined size, the inlet flow path, and the outlet flow path provided therein is connected to the pipe of the air intake system. This configuration may advantageously reduce or remove high-frequency flow noise occurring in the turbocharger by using the acoustic metamaterial unit.

In addition, the acoustic metamaterial unit according to the present disclosure is configured to significantly reduce the volume compared to the resonator of the related art that has been used to reduce flow noise. There are advantages in that the limited space of the engine room may be more efficiently used and, in particular, costs may be significantly reduced.

In addition, the size and shape of the acoustic metamaterial unit according to the present disclosure may be standardized such that the acoustic metamaterial unit may be used compatibly regardless of the type of vehicles. Thus, it is possible to advantageously reduce costs and improve salability.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
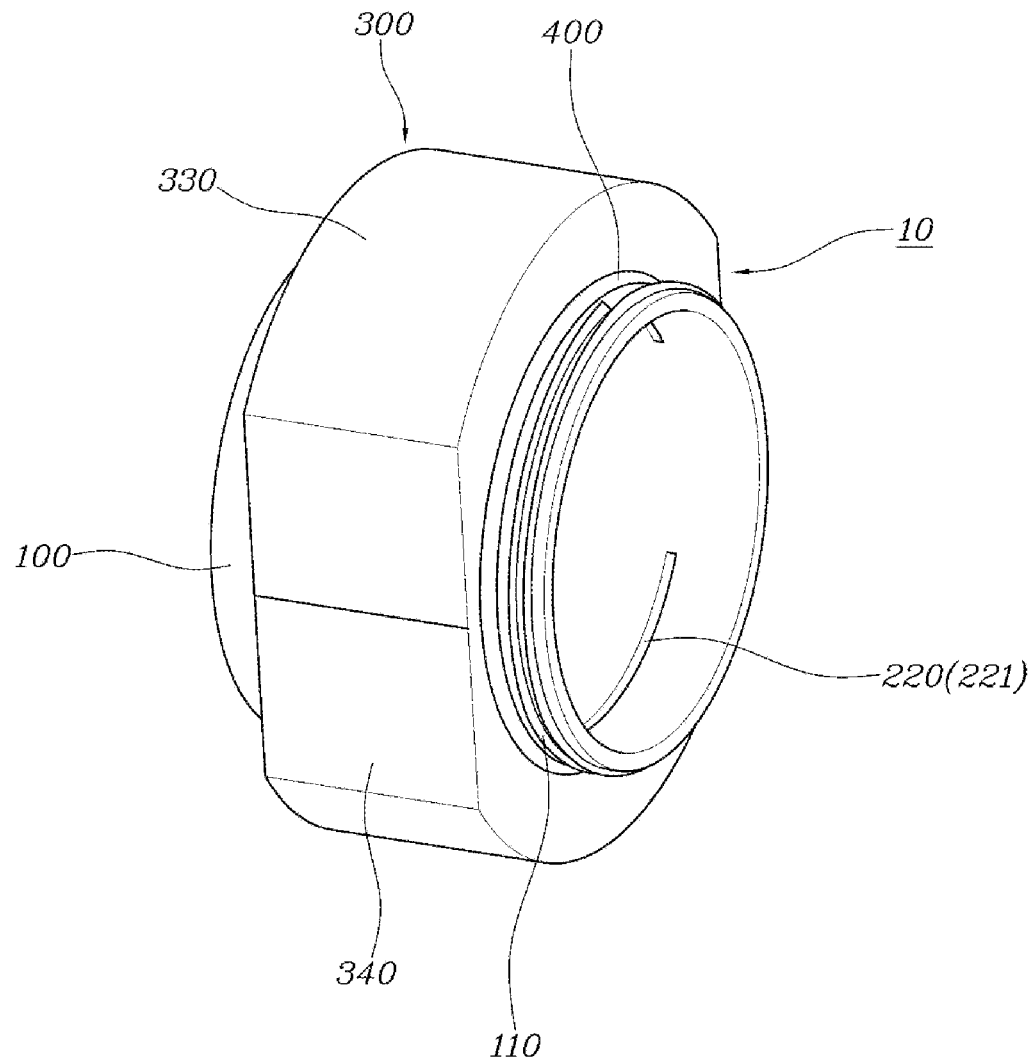
FIG. 1 is a perspective view illustrating an acoustic metamaterial unit for reducing high-frequency flow noise according to an exemplary embodiment of the present disclosure.

Specific structural and functional descriptions of the embodiments of the present disclosure disclosed in this disclosure or application are illustrative only for the purpose of describing the embodiments according to the present disclosure, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and the like may be used to describe various components, but the components should not be limited by these terms. These terms may be used only for the purpose of distinguishing one component from another component, and, for example, a first component may be referred to as a second component, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

The terms used herein are for the purpose of describing only specific embodiments and are not intended to limit the present disclosure. Unless the context clearly dictates otherwise, the singular form includes the plural form. In this disclosure, it should be construed that the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art, and will not be interpreted as having an idealistic or excessively formalistic meaning unless clearly defined in this disclosure.

A control part (controller) according to an exemplary embodiment of the present disclosure may be implemented through an algorithm configured to control operations of various components of the vehicle, a non-volatile memory (not shown) configured to store data relating to software commands to reproduce the algorithm, or a processor (not shown) configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

Hereinafter, an apparatus for reducing flow noise of an air intake system of a vehicle according to exemplary embodiments of the present disclosure will be described with reference to the accompanying drawings.

The engine of a vehicle is an apparatus that generates power by the combustion of fuel mixed at an appropriate ratio with externally introduced air.

In the process of generating power by running the engine, it is possible to obtain an intended amount of power and an intended combustion efficiency by supplying external air and fuel to the cylinder so that the combustion of fuel occurs with air within the cylinder.

After the combustion in the engine for generating power, exhaust gas is produced and then is discharged to the outside.

In the process of generating power by running the engine, the intended amount of power and the intended combustion efficiency may be obtained only by supplying a sufficient amount of external air for combustion. As an apparatus for increasing the intake pressure of combustion air in order to increase the combustion efficiency of the engine, a turbocharger has been used.

The turbocharger is an apparatus in which a turbine is rotated using the pressure of exhaust gas discharged from the engine, a compressor is driven by receiving the rotation force of the turbine, and high-pressure air is supplied to the cylinder by running the compressor, thereby increasing the output of the engine.

In addition, due to the engine downsizing of internal combustion engine (ICE) vehicles, the application of turbochargers to improve fuel efficiency is increasing, and due to the application of turbochargers, high-frequency flow noise, which may be flow noise having a certain frequency or above, occurs in the air intake system of the vehicle.

In order to reduce the high-frequency flow noise occurring in the air intake system of the vehicle, a high-frequency resonator has been applied to the air intake system of the vehicle in the related art. However, due to the relatively-large size of the resonator, it is significantly difficult to effectively dispose the relatively-large resonator in the engine room having a limited space. In addition, since resonators have different shapes according to the vehicle type, resonators are incompatible.

Embodiments of the present disclosure provide a configuration able to reduce high-frequency flow noise occurring in the turbocharger by using an acoustic metamaterial disposed in a pipe of the air intake system of the vehicle in which air flows. Since the acoustic metamaterial having a relatively-small volume may be used in place of the related-art resonator having a relatively-large volume to reduce flow noise, the limited space of the engine room may be more efficiently used. In particular, the acoustic metamaterial may be compatibly used irrespective of the type of vehicles, thereby advantageously reducing costs and improving salability.

In order to realize this objective, as illustrated in FIGS. 1 to 5, the apparatus for reducing flow noise of an air intake system according of a vehicle to an exemplary embodiment of the present disclosure includes: a body member 100 having the shape of a pipe allowing air to flow therethrough; and a cover member 300 coupled to the body member 100 while covering the outer circumferential portion of the body member 100 such that a chamber 210 for reducing high-frequency flow noise is arranged between the cover member 300 and the body member 100. The chamber 210 is connected to the inside of the body member 100 through flow paths 220.

Figure 2:
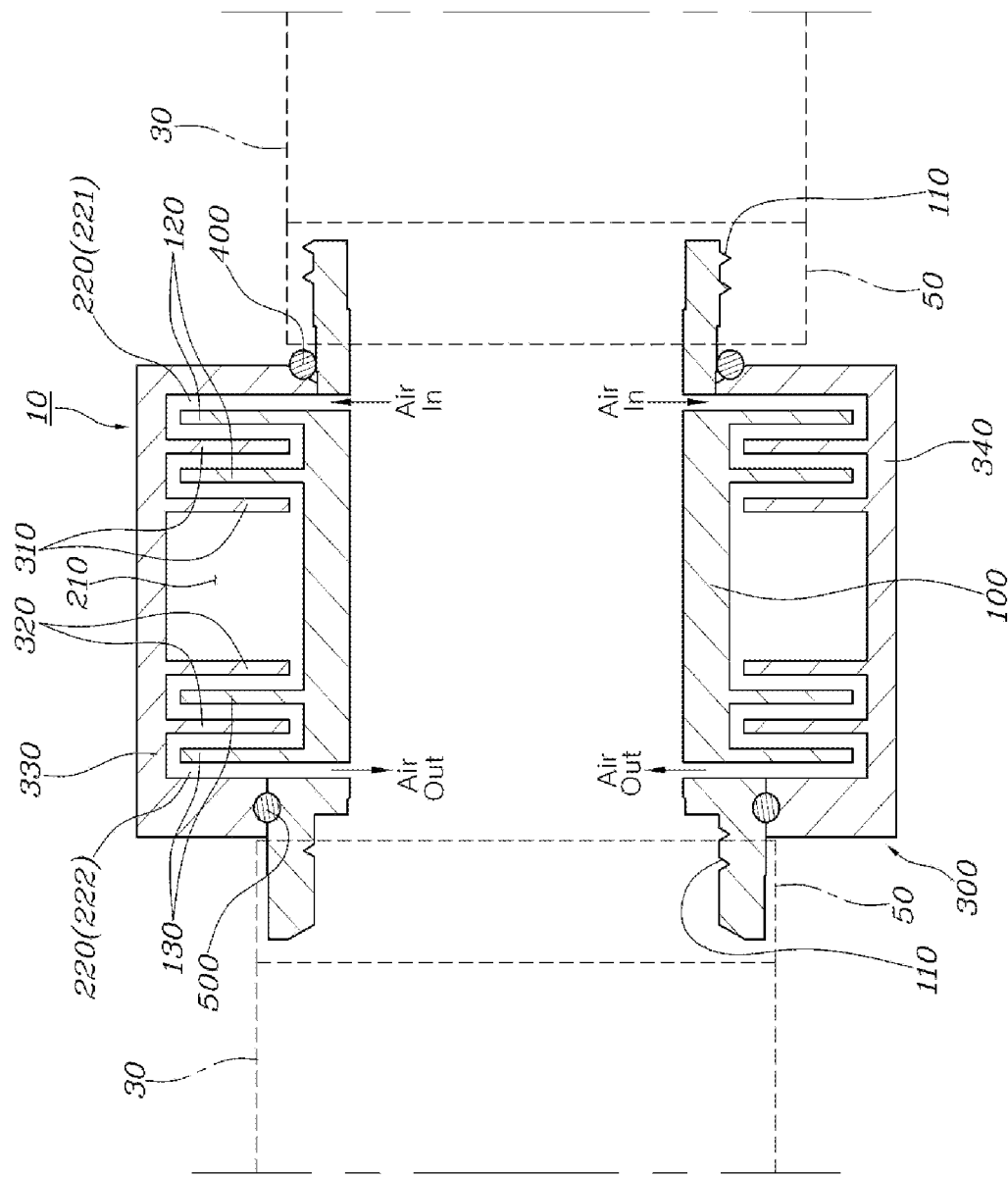
FIG. 2 is a cross-sectional view of FIG. 1.
Figure 3:
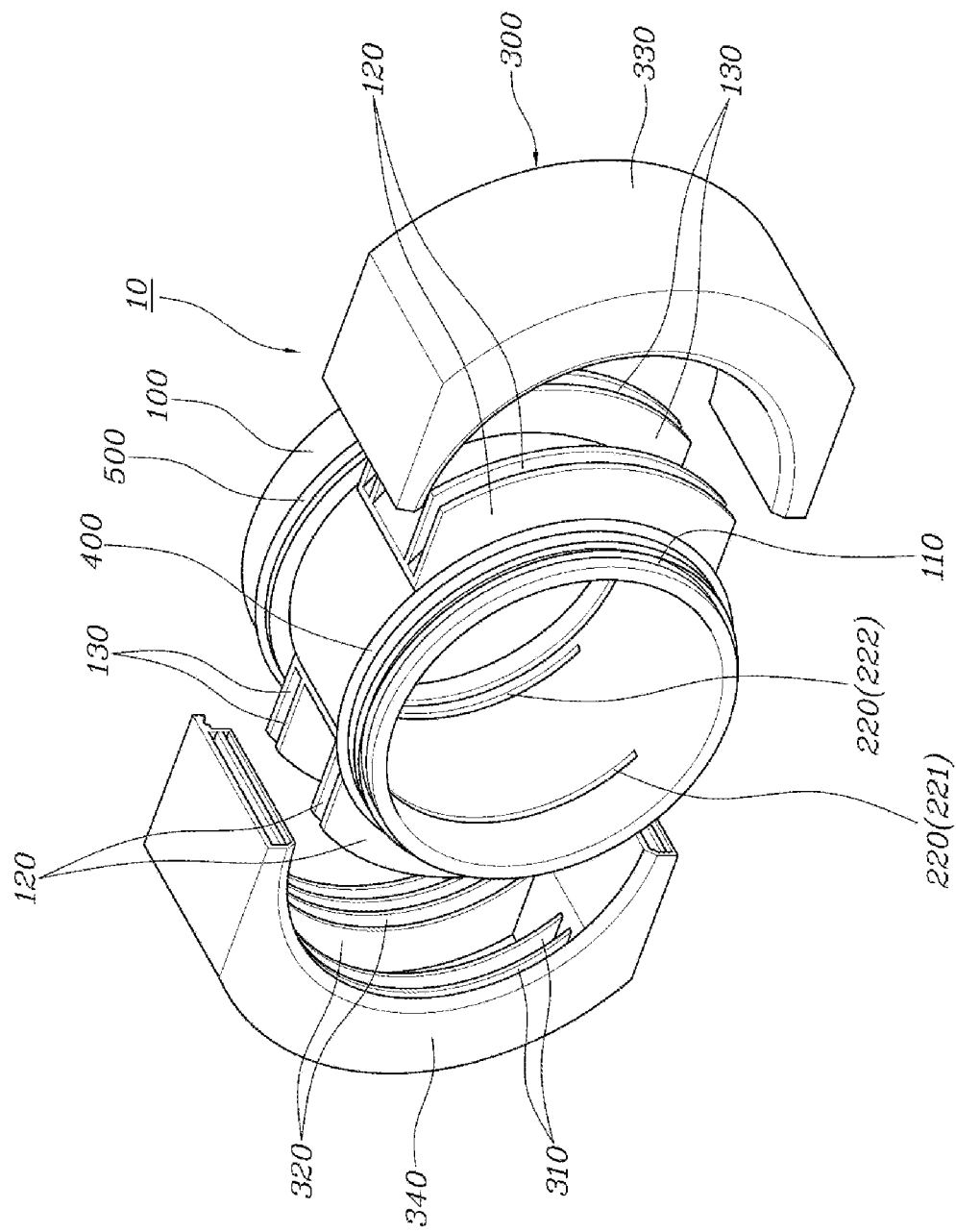
FIG. 3 is an exploded view of FIG. 1.

As illustrated in FIGS. 1 and 2, an assembly of a single body member 100 and a single cover member 300 forms an acoustic metamaterial unit 10. The acoustic metamaterial unit 10 is connected to a pipe 30 of the air intake system to reduce high-frequency flow noise occurring in a turbocharger when the high-frequency flow noise passes through the acoustic metamaterial unit 10. For the connection between the acoustic metamaterial unit 10 and the pipe 30 of the air intake system, the acoustic metamaterial unit 10 is connected to the pipe 30 using a clamp 50.

In general, sound is transmitted through air, i.e. a medium. A method of blocking sound includes forming a plurality of holes or using a material having a high transmission loss. This method resultantly uses a method of blocking the transmission of sound through the air. However, in a space in which air flows, sound causes a diffraction phenomenon. The diffraction phenomenon refers to a phenomenon in which, as the sound is transmitted through the air, vibrations of the air cause noise.

The phase velocity of noise through a medium is the square root of a value obtained by dividing the bulk modulus of the medium with the density of the medium. In addition, it is natural that the density and the bulk modulus are positive values. However, when the density or the bulk modulus may be converted into a negative value, the phase velocity may be an imaginary number, in which condition the sound wave will be attenuated instead of being transmitted and the transmission of sound does not occur. However, this phenomenon may not occur naturally, and thus, must be artificially constructed. Such a material is referred to as a metamaterial. The metamaterial is implemented as a set of composite elements respectively made from a typical material, such as plastic or metal, and is typically a pattern of repeated elements.

Sound is transmitted as vibrations generated by repeated compression and expansion of the medium. The bulk modulus is a measure of resistance to the compression or expansion of the medium. In addition, the definition of the density includes inertia obstructing the transmission (i.e., movement) of noise.

The acoustic metamaterial has a structure in which microscopic unit cells having fine wavelength scales are repeatedly arranged to adjust sound waves. Although each of the unit cells has typical bulk modulus and density values, the overall bulk modulus and density of the medium may be set to be negative values using a specific shape, structure, or arrangement. For example, dynamic density may be set to be a negative value by tuning the shape, structure, and arrangement while forming a variety of unit cells on the basis of a thin membrane having substantially no stiffness. Accordingly, a structure for absorbing or reflecting all sound (i.e., flow noise) in a specific frequency range may be realized using the acoustic metamaterial.

That is, according to embodiments of the present disclosure, high-frequency flow noise occurring in a turbocharger can be reduced or removed by using the acoustic metamaterial unit 10, i.e., an assembly in which the body member 100 including the chamber 210 having a predetermined size and the flow paths 220 and the cover member 300 are assembled, and connecting such an acoustic metamaterial unit 10 to the pipe 30 of the air intake system.

A single acoustic metamaterial unit 10 is able to effectively reduce flow noise (i.e., sound) having a high frequency of 1 kHz or higher. Consequently, there is an advantage in that volume and cost may be significantly reduced compared to a conventional resonator.

In addition, the size and shape of the acoustic metamaterial unit 10 may be standardized and thus be used compatibly regardless of the type of vehicles, thereby advantageously reducing costs and improving salability.

Figure 4:
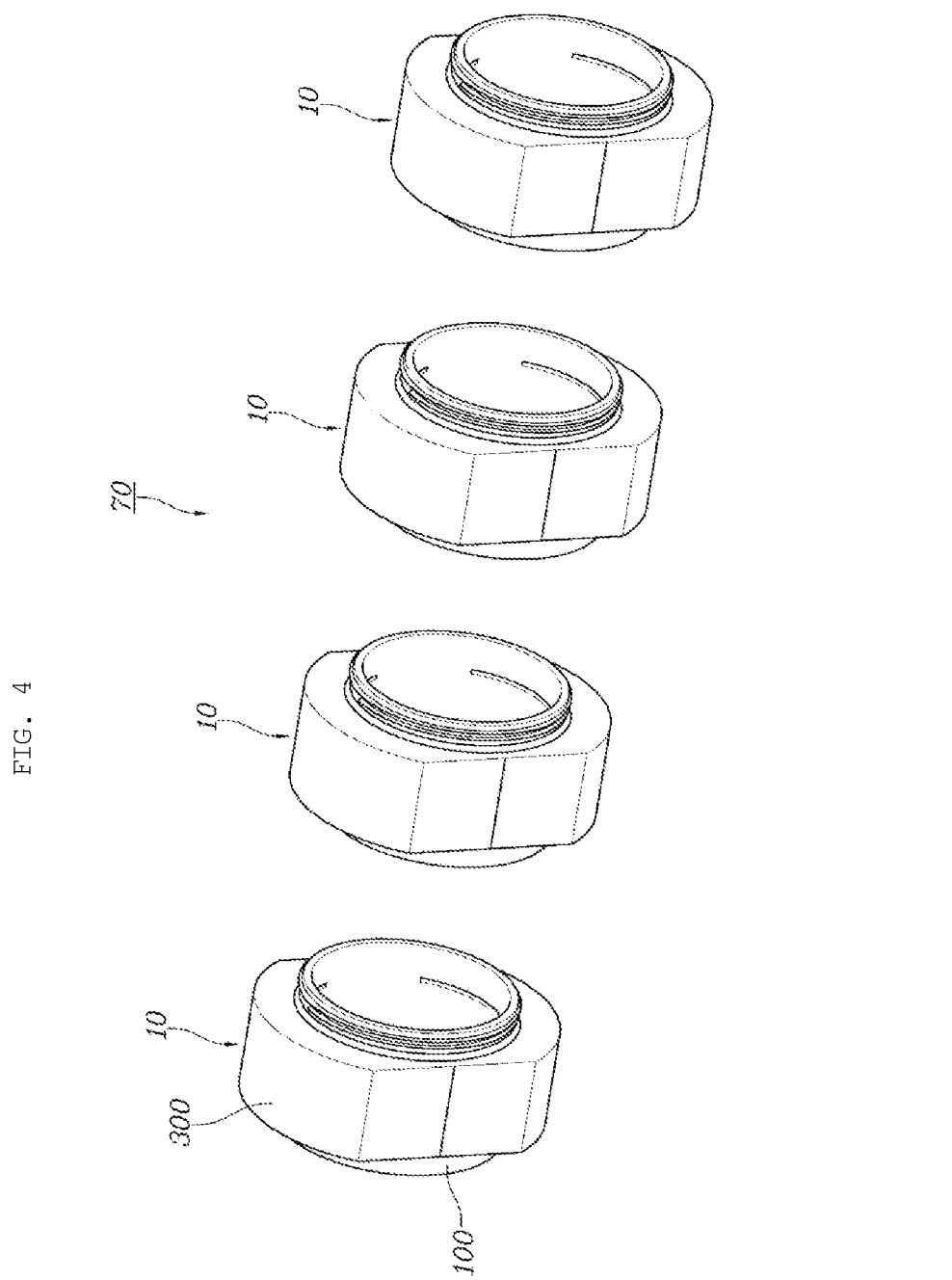
FIG. 4 is a perspective view of an acoustic metamaterial complex comprised of a plurality of acoustic metamaterial units connected in series according to an exemplary embodiment of the present disclosure.
Figure 5:
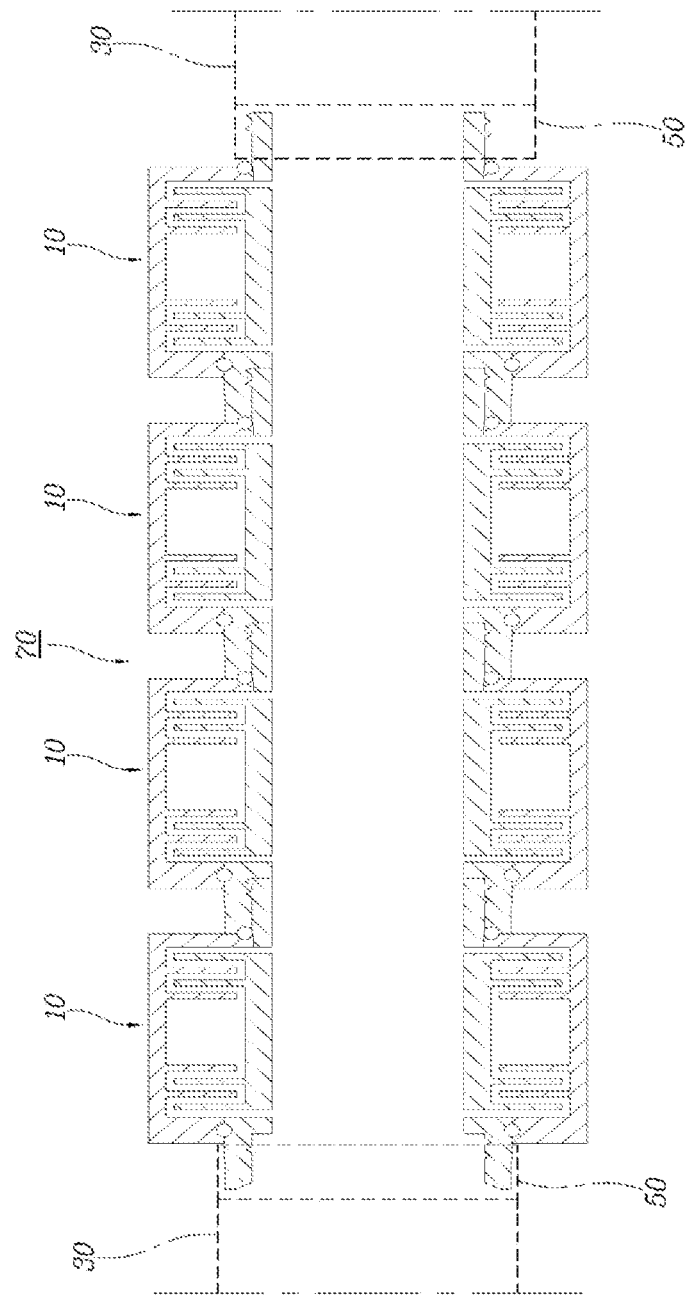
FIG. 5 is a cross-sectional view of FIG. 4.

As illustrated in FIG. 2, the acoustic metamaterial unit 10 may be used by being connected to the pipe 30 of the air intake system. As illustrated in FIGS. 4 and 5, a plurality of acoustic metamaterial units 10 may be connected in series to form an acoustic metamaterial complex 70. The acoustic metamaterial complex 70 may be connected to the pipe 30 of the air intake system such that high-frequency flow noise may be reduced through the acoustic metamaterial complex 70.

The noise-reducing function of the acoustic metamaterial complex 70 is superior to that of the acoustic metamaterial unit 10.

A counterpart component is coupled to one end of the body member 100 of the acoustic metamaterial unit 10. The apparatus according to an exemplary embodiment of the present disclosure further includes a first sealing member 400 coupled to one end of the body member 100 and the counterpart component to maintain the airtightness between one end of the body member 100 and the counterpart component.

Here, the counterpart component coupled to one end of the body member 100 is a body member 100 of another acoustic metamaterial unit 10. The first sealing member 400 serves to maintain the airtightness between the acoustic metamaterial units 10.

In addition, the apparatus according to an exemplary embodiment of the present disclosure further includes a second sealing member 500 coupled to the other end of the body member 100 and the cover member 300 to maintain the airtightness between the other end of the body member 100 and the cover member 300.

Each of the first sealing member 400 and the second sealing member 500 may have the shape of a circular ring and be made from a rubber material to improve airtightness performance but is not limited thereto.

Both ends of the body member 100 protrude toward one side and the other side of the cover member 300. The body member 100 has threads 110 on both ends thereof, respectively, the threads 110 being configured to be coupled with the counterpart components.

The thread 110 formed on one end of the body member 100 (i.e. the right end in FIGS. 1 and 2) is formed on the outer circumferential surface of the body member 100, and the thread 110 formed on the other end of the body member 100 (i.e. the left end in FIGS. 1 and 2) is formed on the inner circumferential surface of the body member 100.

In addition, the counterpart component coupled to the thread 110 of the body member 100 is the body member 100 of the other acoustic metamaterial unit 10. The threads 110 of the body members 100 are coupled to each other to form the acoustic metamaterial complex 70 in which the plurality of acoustic metamaterial units 10 are connected in series, as illustrated in FIGS. 4 and 5.

The chamber 210 provided by the coupling between the body member 100 and the cover member 300 forms an air gap having a predetermined size defined between the body member 100 and the cover member 300. Each of the flow paths 220 includes an inlet flow path 221 extending through the body member 100 to connect one side of the chamber 210 and the inside of the body member 100 and an outlet flow path 222 extending through the body member 100 to connect the other side of the chamber 210 and the inside of the body member 100.

As a plurality of first body ribs 120 outwardly protruding from the body member 100 and a plurality of first cover ribs 310 inwardly protruding from the cover member 300 are disposed to be alternately inserted into each other, the inlet flow path 221 forms a path having a zigzag shape and connected to the inside of the body member 100 and one side of the chamber 210.

In addition, as a plurality of second body ribs 130 outwardly protruding from the body member 100 and a plurality of second cover ribs 320 inwardly protruding from the cover member 300 are disposed to be alternately inserted into each other, the outlet flow path 222 forms a path having a zigzag shape and connected to the inside of the body member 100 and the other side of the chamber 210.

The first body ribs 120 and the second body ribs 130 formed on the body member 100 protrude the same lengths, and the first cover ribs 310 and the second cover ribs 320 formed on the cover member 300 also protrude the same lengths.

In addition, each of the inlet flow path 221 and the outlet flow path 222 is provided as an elongated path having a small cross-section.

When high-frequency flow noise occurring in the turbocharger enters the inlet flow path 221 of the acoustic metamaterial unit 10 during passage through the pipe 30 of the air intake system, a variety of wavelengths are subjected to interference and cancellation in the space in the inlet flow path 221, thereby causing a specific frequency wavelength to resonate in the chamber 210. Due to the resonance occurring in the chamber 210, the high-frequency flow noise occurring in the turbocharger may be reduced or canceled.

When double configurations in each of which the elongated inlet flow path having a small cross-section is disposed in a zigzag pattern are disposed, resonance similar to the Fabry-Perot resonance phenomenon occurs.

Referring to the Fabry-Perot resonance phenomenon, when a wave passes through two parallel sheets of high-reflectivity glass, a variety of wavelengths cause interference and cancellation in the cavity between the sheets of glass, thereby generating internal resonance at a specific wavelength. The Fabry-Perot resonance phenomenon is a technology mainly used in optics. According to embodiments of the present disclosure, the inlet flow path 221 and the outlet flow path 222 serve as sheets of high-reflectivity glass, so that resonance occurs in the chamber 210 corresponding to the air gap. It is possible to reduce or remove high-frequency flow noise occurring in the turbocharger by using the resonance occurring in the chamber 210.

The cover member 300 according to an exemplary embodiment of the present disclosure includes a first cover member 330 and a second cover member 340 disposed symmetrically to each other for the purpose of assemblability and workability. The first cover member 330 and the second cover member 340 cover halves of the outer circumferential portion of the body member 100, i.e., the outer circumferential portion of the body member 100 on one side and the outer circumferential portion of the body member 100 on the other side, respectively. Both ends of the first cover member 330 and the second cover member 340 in contact with each other are fused together.

The fusion between the first cover member 330 and the second cover member 340 may be realized using a structure in which protrusions are melted using heat or vibration so as to be coupled to each other.

As set forth above, the embodiments of the present disclosure provide an assembly of the body member 100 and the cover member 300, i.e., a configuration in which the acoustic metamaterial unit 10 with the chamber 210 having a predetermined size, the inlet flow path 221, and the outlet flow path 222 provided therein is connected to the pipe 30 of the air intake system. This configuration may advantageously reduce or remove high-frequency flow noise occurring in the turbocharger by using the acoustic metamaterial unit 10.

In addition, the acoustic metamaterial unit 10 according to the present disclosure is configured to significantly reduce the volume compared to the resonator of the related art that has been used to reduce flow noise. There are advantages in that the limited space of the engine room may be more efficiently used and, in particular, costs may be significantly reduced.

In addition, the size and shape of the acoustic metamaterial unit 10 according to the present disclosure may be standardized such that the acoustic metamaterial unit 10 may be used compatibly regardless of the type of vehicles. Thus, it is possible to advantageously reduce costs and improve salability.

Although the specific embodiments of the present disclosure have been described and illustrated, those skilled in the art will appreciate that various alternations and modifications are possible without departing from the technical spirit of the present disclosure as disclosed in the appended claims.

What is claimed is:

1. An apparatus for reducing flow noise of an air intake system of a vehicle, the apparatus comprising:
   a pipe-shaped body member configured to allow air to flow therethrough; and
   a cover member coupled to the body member while covering an outer circumferential portion of the body member such that a chamber for reducing flow noise is arranged between the cover member and the body member,
   wherein the chamber is connected to an inside of the body member through a flow path,
   the chamber comprises an air gap having a predetermined size defined between the body member and the cover member, and
   the flow path comprises an inlet flow path extending through the body member to connect a first side of the chamber and the inside of the body member to each other and an outlet flow path extending through the body member to connect a second side of the chamber and the inside of the body member to each other.

2. The apparatus of claim 1, further comprising a first sealing member coupled to a first end of the body member and a counterpart component, configured to be coupled to the first end of the body member, to maintain airtightness between the first end of the body member and the counterpart component.

3. The apparatus of claim 2, wherein an acoustic metamaterial unit is provided as an assembly of a single member of the body member and a single member of the cover member,
   the counterpart component is another acoustic metamaterial unit, and
   the first sealing member is configured to maintain airtightness between the coupled acoustic metamaterial units.

4. The apparatus of claim 1, further comprising a second sealing member coupled to a second end of the body member and the cover member to maintain airtightness between the second end of the body member and the cover member.

5. The apparatus of claim 1, wherein both ends of the body member protrude toward one side and another side of the cover member, and
   the body member comprises threads on the both ends thereof, respectively, the threads being configured to be coupled with counterpart components.

6. The apparatus of claim 1, wherein the inlet flow path comprises a path having a zigzag shape and connected to the inside of the body member and the first side of the chamber, by having a plurality of first body ribs and a plurality of first cover ribs disposed to be alternately inserted into each other, the plurality of first body ribs outwardly protruding from the body member and the plurality of first cover ribs inwardly protruding from the cover member.

7. The apparatus of claim 1, wherein the outlet flow path forms a path having a zigzag shape and connected to the inside of the body member and the second side of the chamber, by having a plurality of second body ribs and a plurality of second cover ribs disposed to be alternately inserted into each other, the plurality of second body ribs outwardly protruding from the body member and the plurality of second cover ribs inwardly protruding from the cover member.

8. The apparatus of claim 1, wherein the cover member comprises a first cover member and a second cover member disposed symmetrically to each other,
   wherein the first cover member and the second cover member cover halves of outer circumferential portions of the body member, which are an outer circumferential portion on one side of the body member and an outer circumferential portion on another side of the body member, respectively, wherein both ends of the first cover member and the second cover member in contact with each other are fused together.

9. The apparatus of claim 1, wherein an acoustic metamaterial unit is provided as an assembly of a single member of the body member and a single member of the cover member,
   wherein the acoustic metamaterial unit is connected to a pipe of the air intake system to reduce flow noise.

10. The apparatus of claim 9, wherein, when flow noise passing through the pipe of the air intake system is introduced into the chamber through the flow path of the acoustic metamaterial unit, resonance of a specific frequency wavelength occurs in the chamber, thereby reducing the flow noise.

11. The apparatus of claim 1, wherein an acoustic metamaterial unit is provided as an assembly of a single member of the body member and a single member of the cover member,
   a plurality of acoustic metamaterial units are connected in series to form an acoustic metamaterial complex, and
   the acoustic metamaterial complex is connected to a pipe of the air intake system to reduce flow noise.

* * * * *